United States Patent
Brandl et al.

(10) Patent No.: US 12,435,716 B2
(45) Date of Patent: Oct. 7, 2025

(54) PRESSURE PACKING FOR A RECIPROCATING PISTON COMPRESSOR WITH BUFFER GAS BARRIER

(71) Applicant: Hoerbiger Wien GmbH, Vienna (AT)

(72) Inventors: Andreas Brandl, Vienna (AT); John Warner Ladd, Vienna (AT); Karl Richard Markey, Vienna (AT); Guido Pratelli, Vienna (AT); Patrick James Raffety, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 416 days.

(21) Appl. No.: 17/740,323

(22) Filed: May 9, 2022

(65) Prior Publication Data

US 2023/0358226 A1    Nov. 9, 2023

(51) Int. Cl.
| | |
|---|---|
| F04B 53/02 | (2006.01) |
| F04B 49/22 | (2006.01) |
| F04B 53/06 | (2006.01) |
| F04B 53/16 | (2006.01) |

(52) U.S. Cl.
CPC ........... *F04B 53/02* (2013.01); *F04B 49/22* (2013.01); *F04B 53/06* (2013.01); *F04B 53/164* (2013.01)

(58) Field of Classification Search
CPC ........ F04B 39/041; F04B 49/22; F04B 53/02; F04B 53/06; F04B 53/164; F16J 15/16–162; F16J 15/32–324; F16J 15/40–406
See application file for complete search history.

(56) References Cited

U.S. PATENT DOCUMENTS

| | | | | |
|---|---|---|---|---|
| 3,019,739 | A * | 2/1962 | Prosser | F04B 53/14 |
| | | | | 277/513 |
| 3,491,654 | A * | 1/1970 | Alfred | F16J 9/206 |
| | | | | 92/162 R |
| 3,657,973 | A * | 4/1972 | Wahrenberger | F04B 39/12 |
| | | | | 417/901 |
| 3,834,715 | A * | 9/1974 | Butler | F16J 15/40 |
| | | | | 277/516 |
| 5,701,797 | A * | 12/1997 | Mohn | F16J 15/406 |
| | | | | 92/111 |
| 6,708,981 | B2 * | 3/2004 | Hall | F16J 15/3404 |
| | | | | 417/372 |
| 10,989,215 | B2 * | 4/2021 | Zhang | F04D 29/124 |

(Continued)

FOREIGN PATENT DOCUMENTS

| | | | | |
|---|---|---|---|---|
| AU | 2013254655 A1 * | 10/2014 | | F01D 11/04 |
| CN | 113915335 A * | 1/2022 | | |

(Continued)

*Primary Examiner* — Alexander B Comley
(74) *Attorney, Agent, or Firm* — Dykema Gossett PLLC

(57) ABSTRACT

For a pressure packing with a buffer gas barrier into which a buffer gas is fed via a buffer gas feeding line, a sensing line is provided that is connected at a first end to a vent volume in the pressure packing with an opposite second end of the sensing line being closed, so that there is no gas flow in the sensing line. A pressure regulator is connected to the buffer gas feeding line for setting the buffer gas pressure in the buffer gas feeding line, whereas, during operation of the pressure packing, the pressure in the sensing line is used as pilot pressure for the pressure regulator for setting the buffer gas pressure.

16 Claims, 5 Drawing Sheets

(56) References Cited

U.S. PATENT DOCUMENTS

| | | | | |
|---|---|---|---|---|
| 2004/0057842 A1* | 3/2004 | Miura | ................... | F04B 27/02 417/313 |
| 2008/0240949 A1* | 10/2008 | Tackett | ................. | F16J 15/406 277/304 |
| 2010/0294374 A1* | 11/2010 | Sears | ................... | F16J 15/3484 137/1 |
| 2011/0298183 A1* | 12/2011 | Lindner-Silwester | ....................... | F16J 15/406 277/500 |
| 2012/0211945 A1* | 8/2012 | Lindner-Silwester | ....................... | F04B 39/041 277/508 |
| 2014/0321972 A1* | 10/2014 | Del Vescovo | ......... | F16J 15/406 415/112 |
| 2015/0086388 A1* | 3/2015 | Hold | ................... | F04B 39/0207 417/53 |
| 2015/0337960 A1* | 11/2015 | Hold | ...................... | F16J 15/002 92/172 |
| 2016/0138584 A1* | 5/2016 | Trevino | .................. | F04B 53/18 417/434 |
| 2018/0051684 A1* | 2/2018 | Bergamini | ................ | F16J 15/56 |
| 2018/0066802 A1* | 3/2018 | Brun | ......................... | F17D 1/12 |
| 2020/0102946 A1* | 4/2020 | Chalk | ................... | F04B 39/128 |
| 2020/0200161 A1* | 6/2020 | Caloone | ................ | F16J 15/002 |
| 2021/0262481 A1* | 8/2021 | Kasatani | ............. | G01M 3/2853 |

FOREIGN PATENT DOCUMENTS

| | | | | |
|---|---|---|---|---|
| EP | 2905468 A1 | * | 8/2015 | .......... F04B 39/0022 |
| GB | 2592179 A | * | 8/2021 | ........... F04D 29/106 |
| JP | 2004116330 A | * | 4/2004 | |
| JP | 2009062871 A | * | 3/2009 | |
| JP | 2017089595 A | * | 5/2017 | |
| JP | 6577343 B2 | * | 9/2019 | |

* cited by examiner

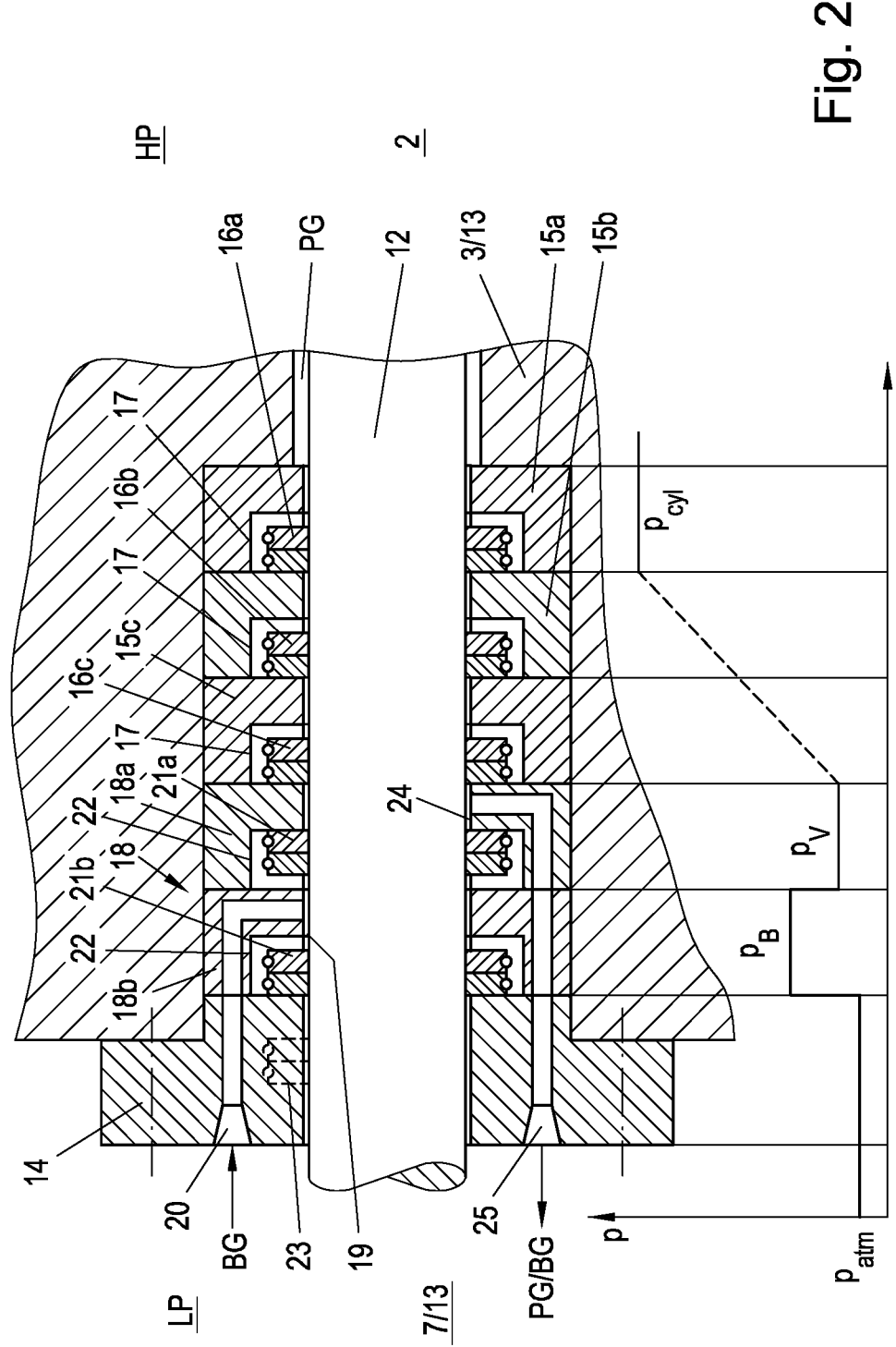

PRESSURE PACKING FOR A RECIPROCATING PISTON COMPRESSOR WITH BUFFER GAS BARRIER

BACKGROUND

The present invention pertains to a pressure packing for a reciprocating piston compressor having a buffer gas barrier at a low-pressure side of the pressure packing and a number of sealing rings at an opposite high-pressure side of the pressure packing, whereas a vent volume is provided in the pressure packing between the buffer gas barrier and the last sealing ring before the buffer gas barrier with a vent line being connected to the vent volume, whereas a buffer gas volume is provided in the buffer gas barrier that is connected to a buffer gas feeding line, whereas, during operation of the pressure packing, a buffer gas with buffer gas pressure is supplied into the buffer gas volume via the buffer gas feeding line with the buffer gas pressure being higher than the vent pressure in the vent volume. The invention pertains also to a method for operating such a pressure packing for a reciprocating piston compressor and to a reciprocating piston compressor with such a pressure packing.

Reciprocating piston compressors for compressing a process gas are well known and are used in many applications and for different process gases. A reciprocating piston compressor comprises at least one cylinder with at least one suction valve and at least one discharge valve for the process gas exchange. In the cylinder a piston reciprocates back and forth driven by a piston rod. A pressure packing surrounds the piston rod to seal the gas in the cylinder. A pressure packing comprises a packing case made up of several adjacent (in the axial direction of the packing case/piston rod) packing cups with sealing rings and/or wiper rings being arranged in the cups. The piston rod is connected to a crosshead which in turn is connected to a crank of a crankshaft. The crosshead translates the rotating movement of the crank into the reciprocating movement of the piston rod. The crank shaft is located in a crankcase. Between the crankcase and the cylinder (or the pressure packing) there is often arranged a distance piece in which the piston rod and sometimes also the crosshead or at least a part of the crosshead reciprocates. Between the distance piece and the crank case there can also be arranged an additional partition packing around the piston rod. In operation of the reciprocating piston compressor there is always a process gas leakage through the pressure packing or around the pressure packing as the pressure packing is never absolutely gastight. Such a process gas leakage is undesirable, not only because of the resulting process gas loss.

Depending on the process gas, process gas leakage can be problematic, especially when toxic, hazardous, combustible or explosive process gas is used.

Any process gas emission into the surroundings of the compressor is undesirable. There are even statutory limitations for such gas emissions that require avoidance of gas emissions into the surroundings. This is especially true if toxic or hazardous process gas is used. In case of combustible or explosive process gas there is additional risk of gas accumulating in the compressor, e.g. in the distance piece or crankcase, that need to be avoided. Gas leakage into the crankcase can also contaminate the crankcase lube oil detrimentally affecting the operation of the compressor. When using a distance the process gas leakage from the cylinder through or around the pressure packing would not directly enter the crankcase but would enter the distance piece first. Leakage of process gas into the crankcase can be reduced in that way but not completely avoided.

It is therefore a general desire in a reciprocating piston compressor to confine and collect process gas leakage from the piston rod pressure packing and to carry the leakage to a safe location away from the compressor.

To achieve this, it is already known to provide a vent line in the pressure packing which provides for connection from a location inside the pressure packing to a location on the exterior of the pressure packing. Connection of additional conduits to the external vent line exit from the pressure packing allows for directing the process gas leakage to a controlled point external to the compressor itself. The vent line is connected to a vent volume, e.g. arranged in a vent cup or between two adjacent sealing rings, in the pressure packing. Process gas leaking into the pressure packing is directed from the vent volume into the vent line.

A vent line in the pressure packing does however not totally prevent process gas leakage, as gas leakage can also occur between adjacent cups or even around the pressure packing.

To further reduce process gas leakage, it also known to use pressurised buffer gas, such as Nitrogen or any other inert or unproblematic gas, in the pressure packing and/or in the distance piece. The pressure of the buffer gas is set to be higher than the pressure of the process gas at the respective location, for example at the low-pressure side of the pressure packing. The buffer gas is fed between two adjacent sealing rings of the pressure packing and forms a gas barrier for the process gas in the pressure packing. In this case, only buffer gas exits the pressure packing. If a vent line is used in the pressure packing, the internal starting point of the vent line in the pressure packing is located between the sealing rings at the high-pressure side of the packing and the gas barrier. In this case, buffer gas would also be removed via the vent line. In the vent line there would be a mixture of buffer gas and process gas. Also, in the partition packing buffer gas could be used to form a gas barrier to reduce the risk of process gas leakage from the distance piece into the crankcase. A gas barrier in the pressure packing or partition packing does however not prevent process gas leakage between cups or around the packing itself. Therefore, it is sometimes also provided to purge the distance piece with purge gas. As purge gas, the same gas is usually used that is used as buffer gas. This means the purge gas is fed into the distance piece and a mixture of purge gas with any process gas leakage is drained from the distance piece. Use of purge gas fed directly into the distance piece works on the principle of diluting and sweeping away process gas leakage rather than to block flow of process gas leakage on the basis of pressure gradient (as in the buffer gas barrier). However, adequate pressure of the purge gas supply must be maintained to assure positive flow into the distance piece.

It is therefore also known to use so called purge panels that provide the required buffer gas for the reciprocating piston compressor. The purge panel comprises the necessary instrumentation, like valves, flow regulators, measurement instruments, etc., needed for providing the buffer gas. It is especially important to be able to control the pressure of the buffer gas, which has to be higher than the gas pressure of the gas to be sealed or has to be high enough to allow purging of the distance piece. Usually, it is requested that the buffer gas pressure is at least 1 bar higher than the gas at the respective location of usage of the buffer gas. For certain locations, for example in the distance piece or the partition packing, the buffer gas pressure could be set statically to a certain pressure. Usage of a buffer gas in a pressure packing with a vent line requires however a dynamically changing buffer gas pressure as the pressure in the packing, and especially in the vent line, usually varies dynamically (depending on the backpressure existing in the vent line, for example if connected to a flare system for flaring leaking process gas). Therefore, the pressure in the vent line is often used as pilot pressure to control a pressure regulator in the purge panel to set the buffer gas pressure.

In many instances, the vent line connected to the vent volume of the pressure packing would be routed through the panel itself in order to be able to use the vent line pressure as pilot pressure for the differential pressure regulator. It is also known to branch off a pilot line from the vent line and to lead the pilot line into the purge panel. This creates however several issues. On lubricated compressors, there is the necessity to install a liquid/gaseous separator for the vent line or pilot line between the compressor and the purge panel, causing extra cost. Another issue is the pressure drop in the vent line caused by flow of gas in the line. In operation of the compressor, the gas leakage from the pressure packing increases over time due to wear of the sealing rings in the packing. This causes the gas flow in the vent line to increase over time which corresponds to an increased pressure drop in the vent line over time. This variable (increasing) pressure drop means that the purge panel reads the wrong pilot pressure from the vent line for controlling the pressure regulator, and therefore the performance of the purge panel degrades over time. This can cause increased emissions of process gas from the compressor, which has to be avoided.

It is therefore an object of the present invention to provide a pressure packing with a vent volume and a buffer gas barrier for a reciprocating piston compressor that avoids the above-mentioned problems.

SUMMARY OF THE INVENTION

This object is achieved by providing a sensing line that is connected at a first end to the vent volume in the pressure packing with an opposite second end of the sensing line being closed, so that there is no gas flow in the sensing line, and by connecting a pressure regulator to the buffer gas feeding line for setting the buffer gas pressure in the buffer gas feeding line, whereas, during operation of the pressure packing, the pressure in the sensing line is used as pilot pressure for the pressure regulator for setting the buffer gas pressure. The sensing line is completely separated from the vent line by which process gas leakage is carried away from the pressure packing. As the sensing line is closed on the end opposite the vent volume and separated from the vent line, there cannot be a gas flow in the sensing line and consequently no pressure drop in the sensing line due to gas flow. This ensures correct readings of the vent pressure that is used as pilot pressure for controlling the pressure regulator for setting the buffer gas pressure for the pressure packing. The buffer gas pressure is preferably set a given differential pressure higher than the pilot pressure (vent pressure).

In an advantageous embodiment, a differential pressure control valve with a pilot input is used as pressure regulator, whereas the sensing sense line is connected to the pilot pressure input of the differential pressure control valve.

The sensing line is advantageously arranged in an upper part of the pressure packing. This, together with the fact that the sensing line is a static line without gas flow, reduces or even eliminates the amount of lubricant oil that can possibly be carried with the sensing line. Therefore, no liquid gas separator is required in the sensing line upstream of the pressure regulator, which reduces the overall costs and equipment complexity.

Using a purge panel with the pressure regulator being arranged in a gas line of the purge panel that connects a buffer gas inlet and a buffer gas outlet of the purge panel, whereas the buffer gas outlet is connected to the buffer gas feeding line and the buffer gas inlet is provided for connecting a buffer gas supply to the purge panel and whereas a sensing sense line inlet is arranged on the purge panel that is connected to the sensing sense line, allows for a neat arrangement of all required instrumentation for providing the buffer gas.

If a purge panel with an enclosure is used, it is especially advantageous to provide a pneumatic booster relay outside of the enclosure with the sensing line being connected to a pilot port of the pneumatic booster relay. In that way it can be ensured that the process gas in the sensing line cannot leak into the enclosure in case of malfunction, which would be hazard.

BRIEF DESCRIPTION OF THE DRAWINGS

The present invention is described in greater detail in the following with reference to FIGS. 1 to 6, which show exemplary, schematic and non-limiting advantageous embodiments of the invention. In the drawings.

DETAILED DESCRIPTION

Figure 1:
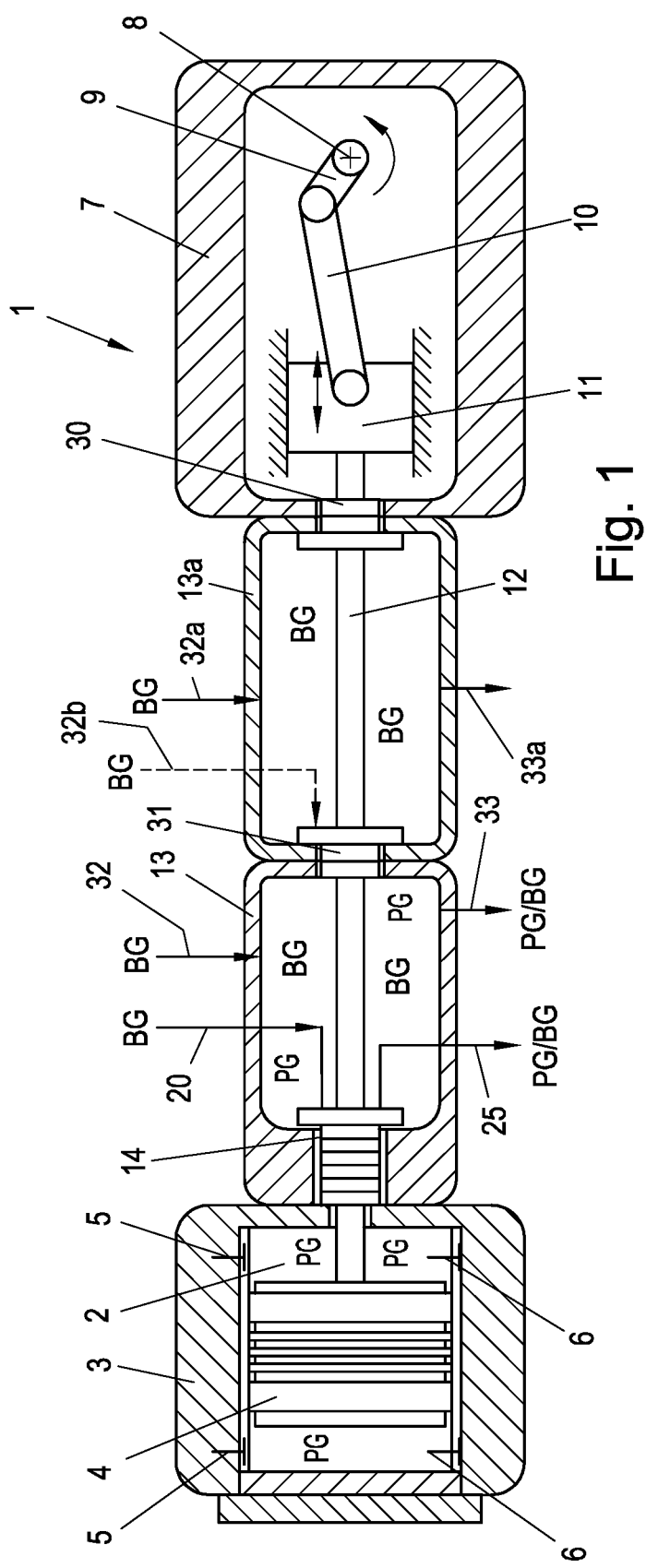
FIG. 1 shows a reciprocating piston compressor with pressure packing, distance pieces and crankcase, FIG. 2 an embodiment of pressure packing, FIG. 3 an inventive pressure packing with buffer gas barrier and sensing line connected to the vent volume, FIG. 4 an embodiment of a purge panel with pressure regulator, FIG. 5 an embodiment of a purge panel with additional instrumentation and FIG. 6 an embodiment of a purge panel with enclosure and pneumatic booster relay outside of the enclosure.

FIG. 1 shows a typical configuration of a reciprocating piston compressor 1 having one cylinder 2 arranged in a cylinder head 3. In the cylinder 2 a piston 4 is reciprocally moved back and forth. In the example of FIG. 1, the compressor 1 is a double-acting piston compressor with two compression volumes in the cylinder 2, one on each side of the piston 4. The compressor 1 could however also be a single-acting piston compressor. The reciprocating piston compressor 1 of FIG. 1 has only one cylinder 2, but could of course have any number of cylinders required. The reciprocating piston compressor 1 could also be implemented as single-stage compressor or as multi-stage compressor. In a multi-stage compressor, the compressed gas of a cylinder is fed into another cylinder for further compression, as is well-known. The cylinder 2 has at least one suction valve 5 and one discharge valve 6 (only schematically indicated in FIG. 1) for every compression volume for process gas exchange. Any known configuration of a suction/discharge valve 5, 6 can be used. The inlet line, connected to the suction valve 5, for feeding process gas to the compressor 1 and the discharge line, connected to the discharge valve 6, for compressed process gas are not shown in FIG. 1 for the sake of simplicity.

In a crankcase 7 a crank shaft 8 having a crank 9 is arranged. The crank shaft 8 is driven by a drive (not shown in FIG. 1), e.g. an electromotor or an engine, and rotates around a rotation axis. A connecting rod 10 is connected to the crank 9 and to a crosshead 11 that is slidingly arranged in the compressor 1, e.g. in the crank case 7 as in FIG. 1 or in any other part of the compressor 1. The crosshead 11 is also connected to a first axial end of a piston rod 12, that is connected on its opposite second axial end to the piston 4. In well-known manner, due to this arrangement, the rotating movement of the crank shaft 8 is translated in a reciprocating movement of the piston rod 12 and consequently also of the piston 4 in the cylinder 4.

A pressure packing 14 is provided around the reciprocating piston rod 12 for sealing the process gas PG in cylinder 2 against other components of the piston compressor 1. The pressure packing 14 can be arranged in the cylinder head 3 or in any other component of the piston compressor 1.

A pressure packing 14 of a reciprocating piston compressor 1 is well-known and comprises several packing cups 15—in FIG. 2 the cups 15 and sealing rings 16 are denoted with lower case letters as 15a, 15b, 15c and 16a, 16b, 16c only to allow differentiation of the different cups 15 and sealing rings 16 if need be. In recesses 17 of the cups 15 sealing rings 16 and/or wiper rings are arranged that are in contact with the piston rod 12. Any suitable sealing ring 16 or sealing ring combination, e.g. radially or tangentially cut sealing rings, non-cut sealing rings, etc., can be used as sealing ring 16. Such sealing rings 16 are well-known in different configurations and do not need to be explained in more detail. Any known wiper ring can be used. Also, a combination of sealing ring(s) with wiper ring(s) in a cup 15 is possible. The sealing rings 16 are the primary process gas seals.

At the low-pressure side LP of the pressure packing 14, i.e. at the side of the packing 14 facing away from the cylinder 2 when in use, a buffer gas barrier 18 is provided by providing a buffer gas volume 19 in the pressure packing 14 into which a buffer gas BG can be fed via a buffer gas feeding line 20. At least a part of the buffer gas feeding line 20 can be arranged in the pressure packing 14. The buffer gas volume 19 is sealed-off against other parts of the pressure packing 14, e.g. by additional sealing rings 21a, 21b, so that the buffer gas volume 19 can be pressurised by means of pressurised buffer gas BG. The exemplary buffer gas volume 19 in FIG. 2 is implemented between two adjacent buffer cups 18a, 18b of the pressure packing 14, whereas in each of the buffer cups 18a, 18b a sealing ring 21a, 21b, or a combination of sealing rings, is arranged in respective recesses 22 of the buffer cups 18a, 18b. When the buffer gas volume 19 is pressurised with the buffer gas BG, the sealing rings 21a, 21b are pressed against opposite axial walls in the pressure packing 14, e.g. a wall of a respective recess 21 or a wall of an adjacent packing part, and against the piston rod 12 to form the buffer gas volume 19 therebetween. The buffer gas volume 19 in the pressure packing 14 could however be implemented in any other suitable manner, such as with a sealing ring 21a, 21b combination in a single cavity buffer volume 19 wherein the sealing rings 21a, 21b prevent gas flow in either direction out of the cavity.

As buffer gas BG an inert gas, like nitrogen, could be used.

The buffer gas volume 19, or the buffer gas BG in the buffer gas volume 19, prevents (or at least reduces) leakage of process gas PG from the high-pressure side HP, e.g. the cylinder 2 side, through the pressure packing 14 to the low-pressure side LP. To this end, the buffer gas pressure $p_B$ in the buffer gas volume 19 is set to be higher than the acting pressure in the pressure packing 14 at the location before (in direction of the high-pressure side HP) the buffer gas volume 19.

Between the buffer gas volume 19 and the primary sealing rings 16a, 16b, 16c a vent volume 24 is formed that is connected to a vent line 25 of the pressure packing 14. The buffer gas volume 19 is sealed against the vent volume 24, e.g. by sealing ring 21a of the buffer gas barrier 18 as in FIG. 2. At least a part of the vent line 25 can be arranged in the pressure packing 14. There could also be additional sealing rings and or wiper rings be arranged between the sealing rings 21a of the buffer gas barrier 18 and the vent volume 24. The vent volume 24 is preferably formed between the last sealing ring 16c before (in direction of the high-pressure side HP) the buffer gas barrier 18 and a sealing ring 21a of the buffer gas barrier 18 facing the high-pressure side HP of the pressure packing 14, as in FIG. 2. The vent volume 24 in FIG. 2 is formed in radial direction by the annular clearance between the piston rod 12 and the inner circumferential surface of the buffer cup 18a and in axial direction between the buffer ring 21a in the buffer cup 18a and the sealing ring 16c in the packing cup 15c adjacent the buffer gas volume 19. The vent volume 24 could however also be implemented differently.

The vent volume 24 and the vent line 25 serve to drain any process gas PG leakage through the pressure packing 14, i.e. through the sealing rings 16a, 16b, 16c.

In some cases, the vent line 25 also drains cylinder 4 and/or piston rod 12 lubricant oil that is for example transported with the process gas PG. The vent line 25 is therefore often arranged on a lower (in the direction of gravity) part of the pressure packing 14, as shown in FIG. 2, which allows collecting lubricant oil by gravity. As a consequence of a combined vent and drain line that carries away process gas PG leakage and lubricant oil, a liquid gas separator is usually required in the vent line 25 downstream of the compressor 1 for removing liquids (lubricant oil) in the leaked process gas before the leaked process gas may be processed further.

An additional wiper ring 23 could be arranged in the pressure packing 14 at the low-pressure side LP of the pressure packing 14 as indicated in FIG. 2 in dashed lines. The wiper ring 23 would serve to wipe off remaining crankcase lubricant oil from the piston rod 12. The wiped off crankcase lubricant could be drained away from the pressure packing 14 in suitable and known manner.

In use of the pressure packing 14 in the compressor 1, the low-pressure side LP of the pressure packing 14 is at the side of the crankcase 7 and the high-pressure side HP is facing the cylinder 2.

The working principle of the pressure packing 14 with buffer gas barrier 18 and vent line 25 is well-known and is explained in FIG. 2 by the resulting pressures in the packing 14 at different locations. The dynamically changing cylinder pressure $p_{cyl}$ acts at the cylinder side (the high-pressure side HP is) of the pressure packing 14. This cylinder pressure $p_{cyl}$ is reduced in the pressure packing 14 across the primary sealing rings 16a, 16b, 16c to the vent pressure $p_V$ in the vent line 25. As it is not important for the invention how this pressure is reduced, the pressure reduction is only indicated in FIG. 2 as dashed line. The vent pressure $p_V$ depends on the acting backpressure in the vent line 25, i.e. to which components the vent line 25 is connected to. At the crankcase side of the pressure packing 14 (the low-pressure side LP) the buffer gas pressure $p_B$ acts in the buffer gas volume 19 of the buffer gas barrier 18. The buffer gas pressure $p_B$ is higher than the vent pressure $p_V$, preferably at least 1 bar higher which prevents process gas PG leakage through the buffer gas barrier 18. Via the vent line 25, a mixture of buffer gas BG (leaking from the buffer gas barrier 18 towards the vent volume 24) and process gas PG leaking through the pressure packing 14 from the high-pressure side HP towards the vent volume 24 is carried away from the compressor 1 to a safe location. A certain amount of buffer gas BG would also leak from the buffer gas barrier 18 into the adjacent part of the reciprocating piston compressor 1, i.e. into the crank case 7 or a distance piece 13, where usually the atmospheric pressure $p_{atm}$ acts.

In the embodiment of FIG. 1, there is also provided a distance piece 13 between the crank case 7 and the cylinder 2 (cylinder head 3)—in the embodiment shown there are two distance pieces 13, 13a, also called outbound distance piece 13 adjacent to the cylinder 2 and inbound distance piece 13a adjacent to the crankcase 7. It should be mentioned that in a reciprocating piston compressor 1 according to the invention there could be any number of distance pieces 13 provided between the crankcase 7 and the cylinder 2 (cylinder head 3), especially also no distance piece, one distance piece or more than one distance pieces.

Between the distance piece 13 (13a) and the crankcase 7 there can be a partition packing 30 in the partition wall between the distance piece 13 (13a) and the crank case 7. Also between two adjacent distance pieces 13, 13a an intermediate packing 31 could be arranged. The partition packing 30 and/or the intermediate packing 31 can be designed similar to the pressure packing 14, i.e. with at least one cup with at least one sealing ring and/or wiper ring being arranged therein.

In an intermediate packing 31, and/or a partition packing 30, an additional buffer gas barrier 18 could be provided that could be implemented as described above for the buffer gas barrier 18 of the pressure packing 14. In an intermediate packing 31, and/or a partition packing 30, there would however usually no vent line 25. The pressurised buffer gas BG fed into the buffer gas barrier 18 of the intermediate packing 31 via intermediate packing buffer gas line 32b (indicated in FIG. 1 in dashed line) would therefore leak into both adjacent distance pieces 13, 13a and would prevent passage of process gas PG from the cylinder side distance piece 13 into the crank case side distance piece 13a. The pressurised buffer gas BG fed into the buffer gas barrier 18 of the partition packing 30 via partition packing buffer gas line (not shown in FIG. 1) would therefore leak into the crankcase 7 and the crankcase side distance piece 13a.

The buffer gas pressure of the buffer gas for the intermediate packing 31 or the partition packing 30 is set to be higher, preferably at least 1 bar higher, than the pressure in the adjacent distance piece 13, 13a or crankcase 7, usually atmospheric pressure $p_{atm}$. As the pressure in the distance piece 13, 13a or crankcase 7 does usually not change, the buffer gas pressure could be set statically to a required value.

A distance piece 13 (13a) could optionally also be purged with buffer gas BG, as shown in FIG. 1. In this embodiment, pressurised buffer gas BG is fed into the distance piece 13, 13a via a distance piece buffer gas line 32, 32a. A mixture of process gas PG and buffer gas BG that accumulates in the distance piece 13, 13a could be drained from the distance piece 13, 13a via a distance piece drain line 33, 33a and carried away to a safe location. The buffer gas pressure of the buffer gas BG for purging the distance piece 13, 13a is set appropriately. As the pressure in the distance piece 13, 13a does usually not change, the buffer gas pressure for purging the distance piece 13, 13a could be set statically to a required value.

From the above explanations it is obvious that buffer gas BG of different pressures could be required for operating a reciprocating piston compressor 1. According to the invention, the reciprocating piston compressor 1 has at least a pressure packing 14 with a buffer gas barrier 18. Hence, at least buffer gas BG with a buffer gas pressure $p_B$ that is always higher than the expected or existing vent pressure $p_V$ is required. In a possible embodiment, the vent pressure $p_V$ is dynamically changing over time. In such an embodiment, the buffer gas pressure $p_B$ is preferably also dynamically changing over time.

As explained above, the buffer gas pressure $p_B$ for the pressure packing 14 has to be higher than the vent pressure $p_V$ in the pressure packing 14. The vent pressure $p_V$ is usually measured in the vent line 25 and is used as pilot pressure for setting a pressure regulator for the buffer gas BG. In case of a dynamically changing buffer gas pressure $p_B$, "setting" means control of the buffer gas pressure $p_B$ in response to the vent pressure $p_V$.

The pressure in the vent line 25 is however affected by the flow of gas through the vent line 25 that causes a pressure drop along the vent line 25. Therefore, a misreading occurs, if the pressure in the vent line 25 is sensed and used for setting (controlling) the buffer gas pressure $p_B$.

As is well-known, the main determinant of the pressure drop is the gas velocity through the vent line 25, whereas the pressure drop increases with increasing gas velocity. As the leakage flow through the vent line 25 increases over time due to wear in the pressure packing 14, the pressure drop increases uncontrollably over time. Consequently, when the buffer gas pressure $p_B$ is controlled with the sensed pressure in the vent line 25, the buffer gas pressure $p_B$, that is set in response to the pressure in the vent line 25, decreases over time. This can cause the pressure difference ($p_B-p_V$) to decrease which will reduce the ability of the buffer gas barrier 18 in the pressure packing 14 to stop and contain the leaked process gas PG. The buffer gas pressure $p_B$ might even fall below the vent pressure $p_V$, which would result in backflow of process gas PG into the buffer gas feeding line 20 and also increased leakage of process gas PG through the pressure packing 14 into the distance piece 13 or crankcase 7.

Figure 3:
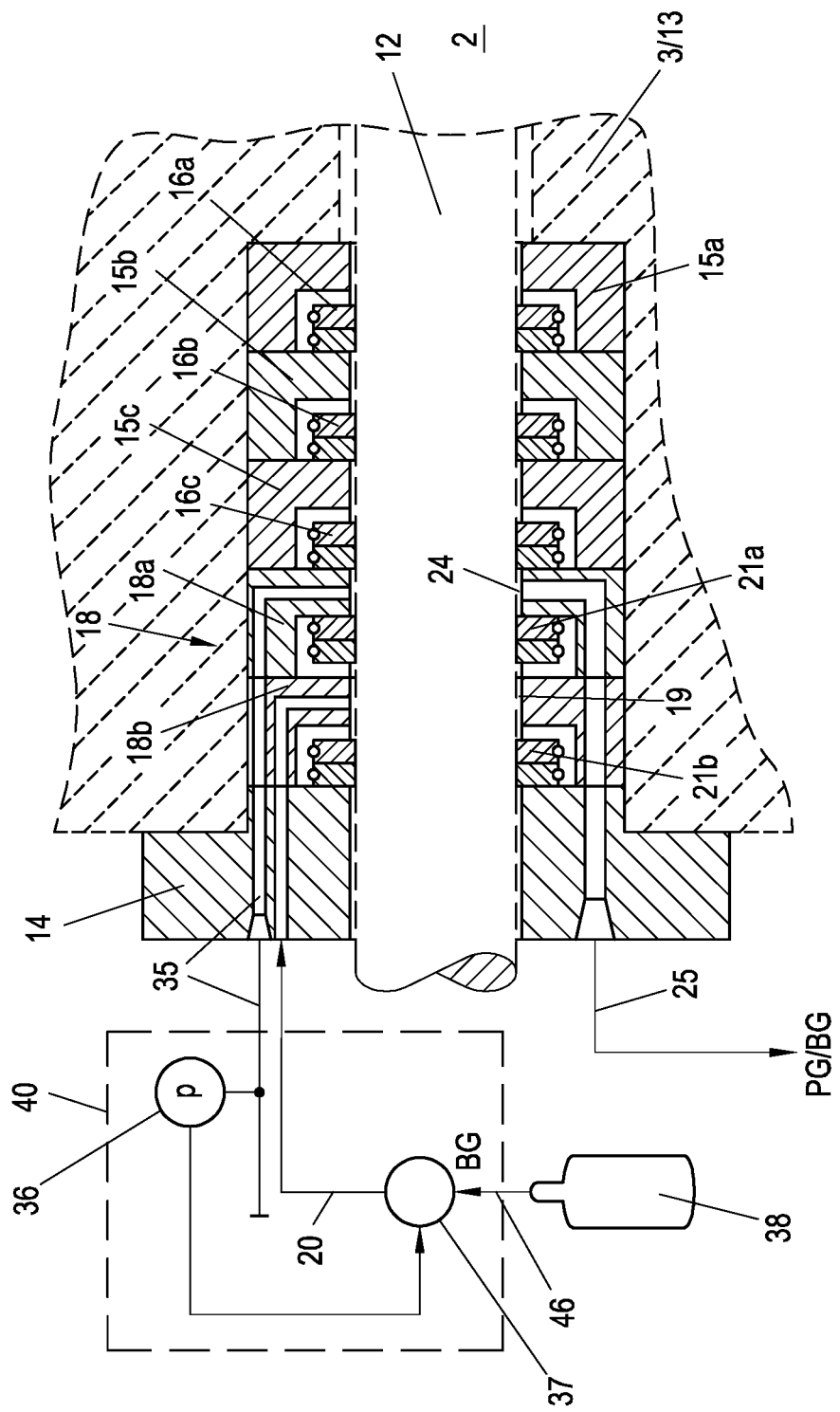

Therefore, according to the invention, the pressure in the vent line 25 is not used as pilot pressure for setting (controlling) the buffer gas pressure $p_B$, e.g. by means of a pressure regulator 37 for the buffer gas BG. Instead, an additional sensing line 35 is provided in the pressure packing 14, as is shown in FIG. 3. One end of the sensing line 35 is connected to the vent volume 24, that is also connected to the vent line 25. The other end of the sensing line 35 is closed, which means that there is no gas flow in the sensing line 35. As there is no gas flow in the sensing line 35, there cannot be a gas flow related pressure drop in the sensing line 35 and a static pressure would result in the sensing line 35 that corresponds to the vent pressure $p_V$ in the vent volume 24. The sensing line 35 is not branched-off the vent line 25, so that the pressure in the sensing line 35 is not affected by the gas flow related pressure drop in the vent line 25.

By sensing the pressure in the sensing line 35, for example using a pressure sensor 36, it is possible to detect the vent pressure $p_V$. If the pressure in the sensing line 35 (that corresponds to the vent pressure $p_V$) is used as pilot pressure for a pressure regulator 37 for setting (controlling) the buffer gas pressure $p_B$ it is ensured that the buffer gas pressure $p_B$ is always kept sufficiently above the vent pressure $p_V$, even in case of a deteriorating pressure packing 14.

In the embodiment of FIG. 3, a buffer gas reservoir 38 provides the buffer gas BG, e.g. nitrogen, to a pressure regulator 37 that is controlled by a pilot pressure, which is the pressure in the sensing line 35 detected by the pressure sensor 36. The flow (volume flow or mass flow) of buffer gas BG depends on the leakage in the pressure packing 14 and does not affect the buffer gas pressure $p_B$.

A differential pressure control valve could be used as pressure regulator 37. A differential pressure control valve ensures a constant differential pressure in a line with variable flow. The differential pressure control valve has a pilot pressure input and allows to set a desired differential pressure with respect to the pilot pressure. In this case, the sensing line 35 could be connected to the pilot pressure input of the differential pressure control valve and the vent pressure $p_V$ in the sensing line 35 would be the pilot pressure for the differential pressure control valve. The sensing line 35 would terminate in the differential pressure control valve, ensuring again a static pressure in the sensing line 35. The differential pressure control valve would be arranged in the buffer gas feeding line 20 to control the buffer gas pressure $p_B$ with a set pressure offset (differential pressure) to the pilot pressure (vent pressure $p_V$).

The buffer gas BG for the pressure packing 14 is preferably provided by a purge panel 40, as indicated in FIG. 3 in dashed lines.

The sensing line 35 is preferably arranged in an upper (in direction of gravity) part of the pressure packing 14. This, together with the fact that the sensing line 35 is a static line without gas flow, reduces or even eliminates the amount of lubricant oil that can be carried with sensing line 35. Therefore, no liquid gas separator is usually required in the sensing line 35 upstream of the purge panel 40, which reduces the costs of the system.

Figure 4:
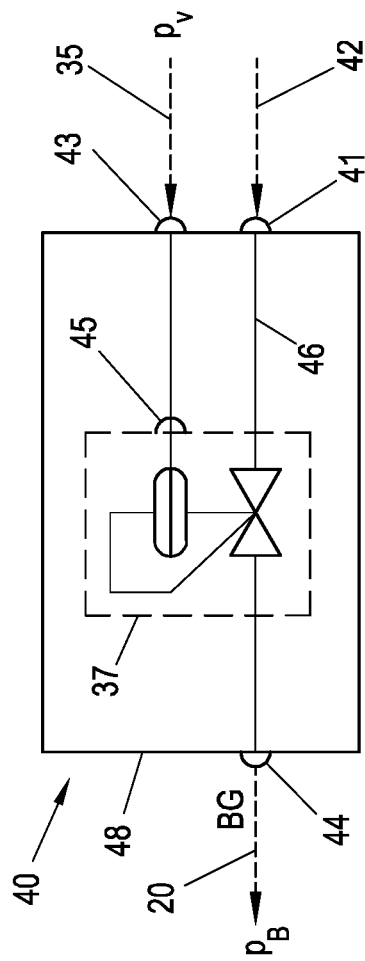

FIG. 4 shows a schematic of a purge panel 40 for providing the buffer gas BG for the pressure packing 14. The purge panel 40 can be arranged in a purge panel enclosure 48 (as indicated in FIG. 4), could however also be proved without enclosure. In case of a purge panel enclosure 48 there would preferably be provided a door that allows access to the instrumentation arranged in the purge panel enclosure 48. The purge panel 40 has a buffer gas inlet 41 for connecting a buffer gas BG supply line 42, that is for example connected to a buffer gas supply 38. If the purge panel 40 has a purge panel enclosure 48 and the buffer gas supply is provided in the purge panel enclosure 48, the buffer gas inlet 41 could also be avoided.

The purge panel 40 has a sensing line inlet 43 for connecting the sensing line 35 to the purge panel 40. The sensing line 35 extends from the sensing line inlet 43 into the purge panel 40. The end of the sensing line 35 in the purge panel 40 is closed, so that there is no gas flow in the sensing line 35 when connected to the purge panel 40. The purge panel 40 has a buffer gas outlet 44, to which the buffer gas feeding line 20 is connected in use of the purge panel 40. The buffer gas inlet 41 and the buffer gas outlet 44 are connected in the purge panel 40 by a gas line 46. In the gas line 46 a pressure regulator 37 is provided, in the example of FIG. 4 a differential pressure control valve, for setting the puffer gas pressure $p_B$ at the buffer gas output connector 44, and by that also in the buffer gas feeding line 20 connected thereto.

In this embodiment, the sensing line 35 is connected to a pilot input 45 of the differential pressure control valve at which the sensing line 35 terminates. The differential pressure, which is preferably preset, between the pressure at the pilot input 45 and the output pressure of the differential pressure control valve (the buffer gas pressure $p_B$) is set by the differential pressure control valve. Hence, the buffer gas pressure $p_B$ is offset from the pilot pressure (vent pressure $p_V$) by the preset differential pressure and follows the vent pressure $p_V$ in the sense line 35.

When the purge panel 40 supplies more than one pressure packing 14 with buffer gas BG, in each case under control of a vent pressure $p_V$ in a sensing line 35 of the respective pressure packing, then the purge panel 40 could also be equipped with more than one pressure regulator 37. In this case, there would be a sensing line inlet 43 for each pressure regulator for connecting the respective sensing line 35 to the purge panel 40. There would also be a buffer gas output connector 44 for each pressure regulator 37 for connecting the respective buffer gas feeding line 20 to the purge panel 40.

The purge panel 40 could also be equipped with additional instrumentation, as will be described with reference to FIG. 5.

The buffer gas BG is fed into the purge panel 40 via buffer gas inlet 41, to which a buffer gas supply line 42, connected on the other end to a buffer gas supply 38, is connected when the purge panel 40 is in use. In the purge panel 40, the buffer gas inlet 41 is connected to a gas line 46.

In the gas line 46 an isolation valve 50 is arranged downstream of the buffer gas inlet 41. If an operator wants to perform a routine maintenance operation of the purge panel 40 and isolates the purge panel 40 from the buffer gas supply via the isolation valve 50, the purge panel 40 will remain pressurized and pose a hazard when the operator tries to open a component which is under pressure. Therefore, preferably an isolation valve 50 with downstream vent is used, which automatically depressurizes the panel as soon as the isolation valve 50 is switched into closed position. Such an isolation valve 50 shuts off the gas line 46 upstream of the isolation valve 50 when in closed position. But, when in closed position, the isolation valve 50 opens a vent port on the isolation valve 50 that is connected to the gas line 50 downstream of the isolation valve 50. Hence, the gas line 46 downstream of the isolation valve 50 is depressurized via the vent port when the isolation valve 50 is closed. In the embodiment of FIG. 5, there cannot be any backflow of buffer gas BG from the outlets of the purge panel 40, because there are check valves 55 upstream the outlets of the purge panel 40. Such an isolation valve 50 with downstream vent together with check valves 55 at the outlets guarantees operator safety in all situations.

In the gas line 46, preferably downstream of the isolation valve 50 and upstream of further instrumentation, there can also be provided a filter 52, for filtering the buffer gas BG fed into the purge panel 40.

In the inlet section of the gas line 46, there can also be provided a first pressure control valve 53. The gas pressure of the buffer gas BG fed into the purge panel 40 could be varying for different reasons. It is therefore advantageous to set a specified gas pressure in the gas line 46 in the purge panel 40 via the first pressure control valve 53.

Downstream of the first pressure control valve 53 the gas line 46 is fed to the pressure regulator 37 for setting the desired buffer gas pressure as explained above.

Figure 5:
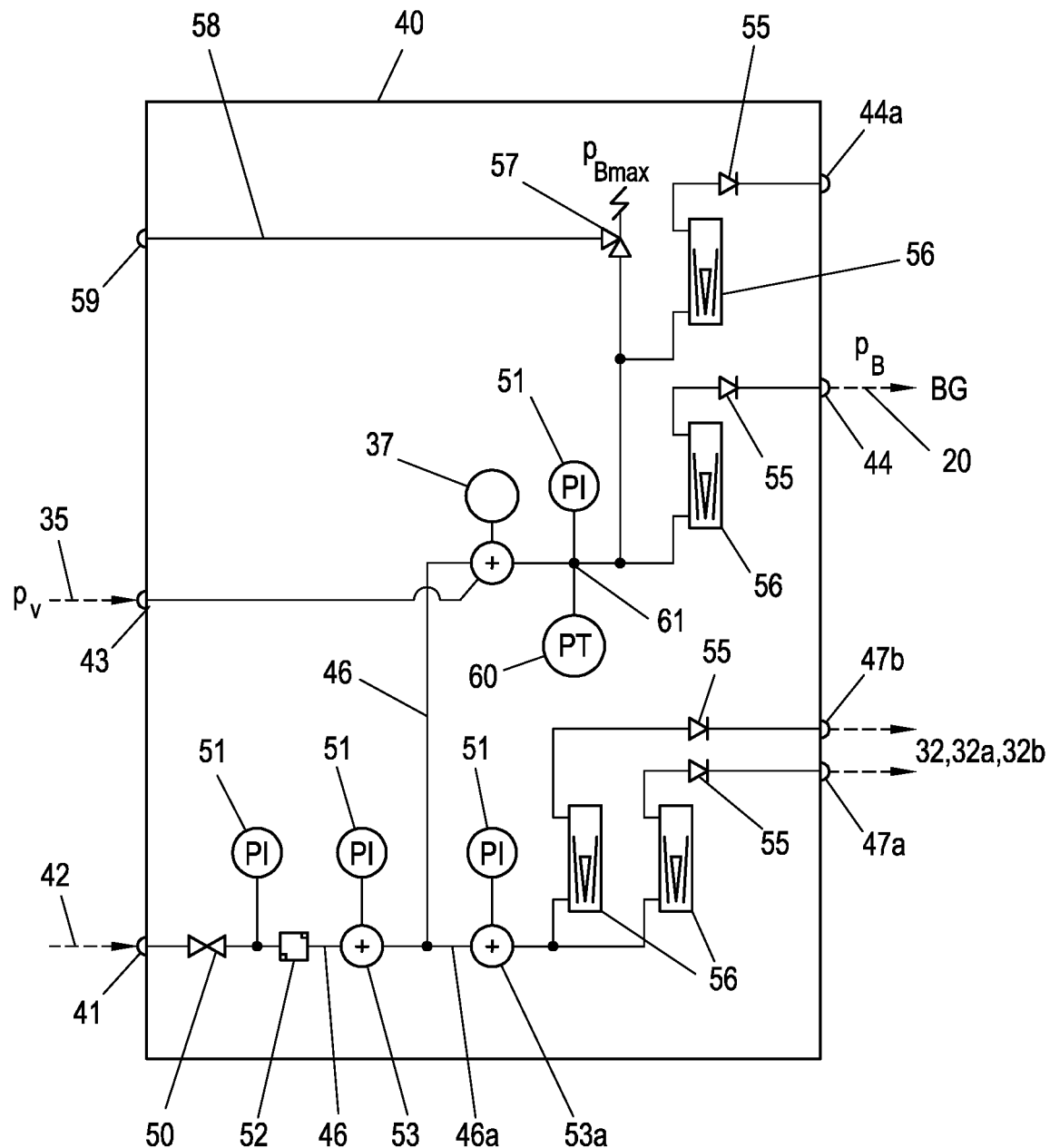

In the embodiment of FIG. 5, a second gas line 46a branches off from the gas line 46 downstream of the first pressure control valve 53 and upstream of the pressure regulator 37. In this second gas line 46a a second pressure control valve 53a could be provided for setting the desired gas pressure in the second gas line 46a. Downstream of the second pressure control valve 53a, the second gas line 46a is connected to a number of buffer gas outlets 47a, 47b of the purge panel 40, in the embodiment of FIG. 5 two buffer gas outlets 47a, 47b. At these buffer gas outlets 47a, 47b, a constant buffer gas BG pressure could be set via the first pressure control valve 53 and/or second pressure control valve 53a (if present). These buffer gas outlets 47a, 47b could for example be connected to the distance piece buffer gas lines 32, 32a or intermediate packing buffer gas line 32b (see FIG. 1) or to a partition packing buffer gas line for providing a buffer gas BG with constant gas pressure for purging the distance piece 13, 13a or for supplying the buffer gas barrier 18 to the intermediate packing 31 or partition packing 30.

There can however also be more second gas lines 46a be provided in a purge panel 40, with each second gas line 46a being equipped with its own second pressure control valve 53a. Each second gas line 46a can be connected to a number of buffer gas outlets 47a, 47b.

In the embodiment of FIG. 5, there are two buffer gas outlets 44, 44a provided, for example, for supplying buffer gas BG to two pressure packings 14 of a reciprocating piston compressor 1. The buffer gas outlets 44, 44a are connected to the pressure regulator 37 as explained in FIG. 4. There can be any number of pressure regulators 37 connected in each case to any number of buffer gas outlets 44, 44a provided in the purge panel 40.

The purge panel 40 can also be equipped with a pressure relief valve 57 that is connected to the gas line 46 downstream of the pressure regulator 37, as in FIG. 5. The pressure relief valve 57 would be set to a certain allowed buffer gas pressure $p_{Bmax}$. If the buffer gas pressure $p_B$ in the gas line 46 exceeds this allowed buffer gas pressure $p_{Bmax}$, the pressure relief valve 57 would open to prevent damage at the reciprocating piston compressor 1 connected to the purge panel 40, e.g. damage of the pressure packing 14. If a second gas line 46a is provided in the purge panel 40 there could of course also be a second pressure relief valve 57 provided for the second gas line 46a. The release pressure of the second pressure relief valve 57 could of course also be set differently as compared to other pressure relief valves 57 in the purge panel 40.

A pressure relief valve 57 could also open into an overpressure line 58 in the purge panel 40 which in turn could be connected to an overpressure outlet 59, that could open into atmosphere. This is especially preferred when the purge panel 40 is provided with a purge panel enclosure 48.

Furthermore, some monitoring instrumentation can be provided in the purge panel 40 at certain locations. For example, a pressure indicator 51 could be used to display the acting pressure at certain locations in the gas line 46 and/or a second gas line 46a. A flow indicator 56 could be used to display the actual buffer gas flow through certain parts of the gas line 46 and/or a second gas line 46a.

In case of a purge panel enclosure 48 it is advantageous when the purge panel enclosure 48 is open or transparent in the region of a monitoring instrument so that the monitoring instrument is visible from outside. To this end a door of the purge panel enclosure 48 could partly be transparent.

The purge panel 40 can be designed to provide any required number of buffer gas outlets 44, 44a. Each buffer gas outlets 44, 44a could be connected to a separate pressure regulator 37, for allowing to set the buffer gas pressure $p_B$ at each buffer gas outlets 44, 44a separately. Some of the buffer gas outlets 44, 44a could however also be connected to a common pressure regulator 37 (as in FIG. 5). In addition, there can also be provided a number of second gas lines 46a connected to a number of additional buffer gas outlets 47a, 47b, at which a constant buffer gas pressure $p_B$ could be set via a first pressure control valve 53 and/or second pressure control valve 53a (if present). This allows to adapt the purge panel 40 flexibly to the requirements of a specific reciprocating piston compressor 1.

A valve could also be provided upstream of a certain buffer gas outlet 44, 44a, 47a, 47b to shut off this buffer gas outlet 44, 44a, 47a, 47b in case it is not needed.

Figure 6:
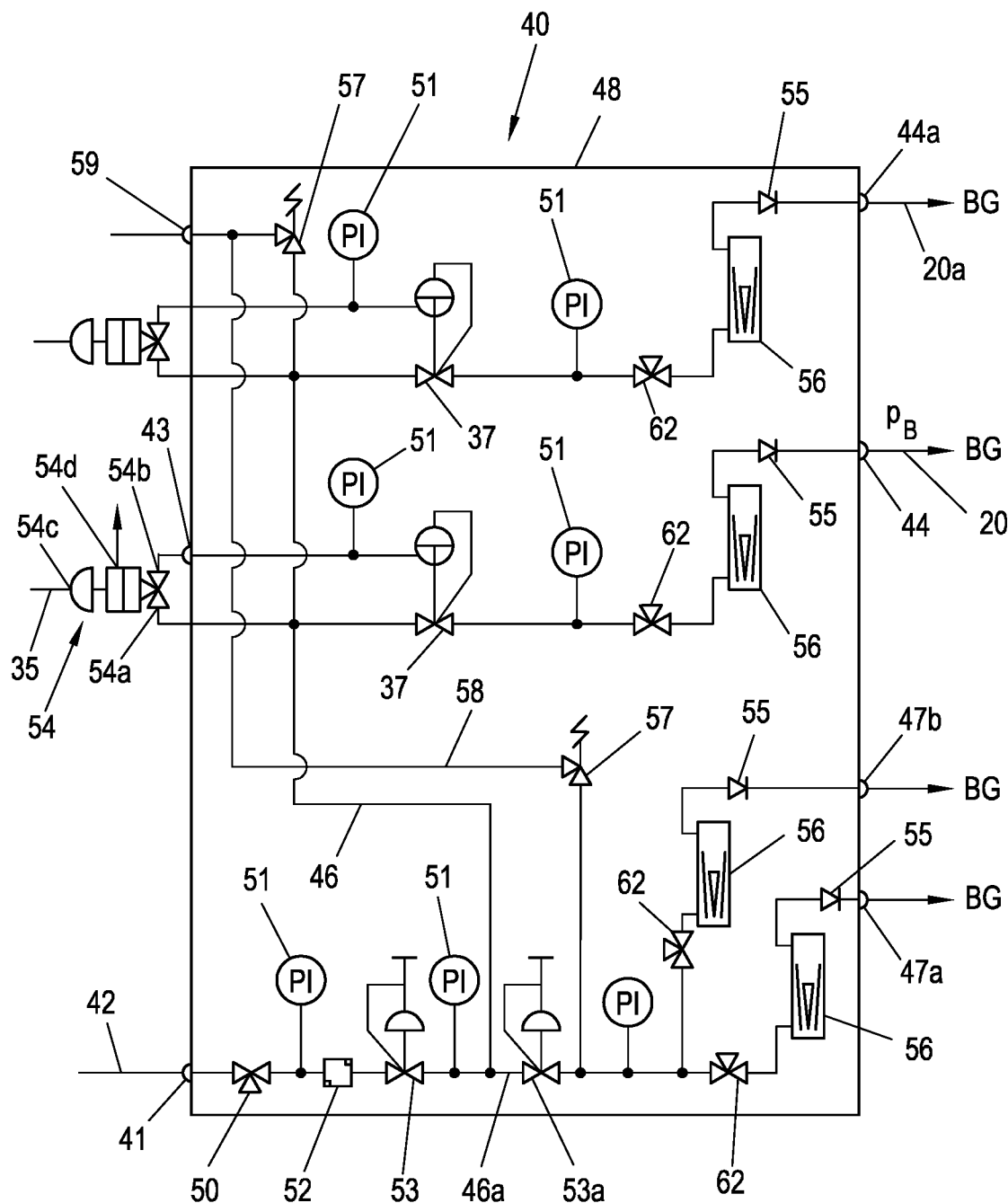

If the purge panel 40 is arranged in an enclosure 48, it is advantageous for safety reasons to avoid hazardous process gas PG to accumulate in the enclosure 48 in case of malfunction. In operation, the sensing line 35 is filled with process gas PG mixed with some buffer gas BG. Theoretically, the sensing line 35 is gas-tight, but in reality, there is always the possibility of an accidental leakage in the enclosure 48 of the purge panel 40 and the possibility of fugitive leaks and accumulation of process gas PG in the enclosure cannot be excluded, which is a potential hazard. To avoid accumulation of process gas PG in the enclosure 48, a pneumatic booster relay 54 could be used. Such a configuration is shown in FIG. 6. A pneumatic booster relay 54 can however also be provided in other embodiments of the purge panel 40, e.g. as in FIG. 4 or FIG. 5.

A pneumatic booster relay is a known pneumatic device that regulates the pressure of a stream of gas based on a pilot pressure. According to a known embodiment, a pneumatic booster relay 54 has four ports, a supply port 54a, an outlet port 54b, a pilot port 54c and an exhaust port 54d. When a pilot pressure is applied to the pilot port 54c, the main valve assembly of the pneumatic booster relay 54 opens to allow flow from the supply port 54a to the outlet port 54b. When the sensing assembly of the pneumatic booster relay 54 detects that the outlet pressure at the outlet port 54b is equal to the pilot pressure, the main valve moves to a rest position in which the outlet port 54b and the exhaust port 54d are blocked (not connected to the any other port) and will remain in this position until there is a change in the pilot pressure or outlet pressure. If the sensing assembly detects that the outlet pressure is higher than the pilot pressure, the exhaust port 54d opens to vent the excess pressure, for example into an exhaust line or into the surroundings. If the sensing assembly detects that the outlet pressure is lower than the pilot pressure, the main valve opens to connect the supply port 54a to the outlet port 54b for recharging the system to the pilot pressure. In that way, the output pressure at the output port 54b corresponds to the pilot pressure at the pilot port 54a.

When the pneumatic booster relay 54 is arranged outside of the enclosure 48 of the purge panel 40 and the sensing line 35 is connected to the pilot port 54c of the pneumatic booster relay 54, it can be ensured that no process gas PG enters the enclosure 48, as the pilot port 54c of the pneumatic booster relay 54 cannot be connected to the output port 54b of the pneumatic booster relay 54. The supply port 54a of the pneumatic booster relay 54 is connected to the gas line 46 of the purge panel 40 so that buffer gas is supplied to the pneumatic booster relay 54. The sensing line 35 would in this embodiment not be connected directly to the pilot input 45 of the differential regulator 37 but to the pilot port 54c of the pneumatic booster relay 54 and would terminate there. Hence, the pilot pressure of the pneumatic booster relay 54 corresponds again to the vent pressure $p_V$ in the sensing line 35. This means that the output pressure of the buffer gas at the output port 54b of the pneumatic booster relay 54 corresponds also to the vent pressure $p_V$. The output port 54b of the pneumatic booster relay 54 is therefore connected to the sensing line inlet 43 and further to the pilot input 45 of the differential regulator 37 to set the pilot pressure for the pressure regulator 37. As a result, the process gas PG contained in sensing line 35 is entirely kept outside of the enclosure 48 thereby preventing any leakage of process gas PG into the enclosure 48 even in case of malfunction of any component in the enclosure 48.

FIG. 6 shows an embodiment of the purge panel with a pressure regulator 37 for every buffer gas outlet 44, 44a. The buffer gas pressures $p_B$ at every buffer gas outlet 44, 44a can be set independently from each other by means of the respective pressure regulator 37.

In the embodiment of FIG. 6 valves 62 are shown that allow to shut-off certain outlets of the purge panel 40 as need be.

In a further advantageous embodiment of a purge panel 40 provisions can be made on the purge panel 40 to allow integration of digital measurement instruments 60, like digital pressure or flow transducer. To this end certain connectors 61 could be provided at the purge panel 40 at certain locations which allow connection of such digital measurement instruments 60. Usage of digital measurement instruments allow integration of a purge panel 40 in a digital control of the purge panel 40 or the reciprocating piston compressor 1.

In FIG. 5 as example of digital measurement instruments 60 a pressure transducer PT is shown that is connected to a connected 61 at the purge panel 40. The measurement signal of the pressure transducer PT could be send to a control unit for further processing and could be used for monitoring and/or controlling the function of the purge panel 40.

It would be especially advantageous to arrange all analogue instrumentation and piping on a front side of a purge panel 40 and to provide the connectors for the digital measurement instruments at the back side of the purge panel 40. This would allow easy and safe separation of the analogue and digital instrumentation. Furthermore, the user of a purge panel 40 could decide if and which (type, manufacturer) digital measurement instruments he wants to use.

The minimum configuration of a purge panel 40 is shown in FIG. 4. All additional instrumentation as explained with reference to FIG. 5 is optional. All additional instrumentation could be used in any combination. Especially, the isolation valve 50, a filter 52, the first pressure control valve 53, a second gas line 46a with a second pressure control valve 53 and buffer gas outlet 47a, 47b, a pressure relief valve 57, connectors 61 for digital measurement instruments 60, a pneumatic booster relay, an additional pressure regulator 37 with additional buffer gas outlet 44a can be provided on the purge panel 40 as needed, in any combination and independently of each other.

What is claimed is:

1. A pressure packing for a reciprocating piston compressor, the pressure packing comprising
   a buffer gas barrier at a low-pressure side of the pressure packing, the buffer gas barrier including a buffer gas volume;
   a number of sealing rings at an opposite high-pressure side of the pressure packing;
   a vent volume between the buffer gas barrier and a last sealing ring of the number of sealing rings before the buffer gas barrier;
   a vent line connected to the vent volume;
   wherein the vent line is provided for a flow of gas therethrough to drain gas from the vent volume;
   a buffer gas feeding line connected to the buffer gas volume of the buffer gas barrier;
   wherein the pressure packing is configured and arranged during operation to supply a buffer gas with buffer gas pressure into the buffer gas volume via the buffer gas feeding line, wherein the buffer gas pressure is higher than a vent pressure in the vent volume;
   a sensing line separated from and not branched-off the vent line,
   wherein the sensing line is connected at a first end to the vent volume with an opposite second end of the sensing line being closed,
   wherein the vent volume is connected to the vent line and to the sensing line,
   wherein the sensing line is configured and arranged so that no gas flows from the first end connected to the vent volume out of the opposite second end while there is gas flow through the vent line; and
   a pressure regulator connected to the buffer gas feeding line, the pressure regulator configured and arranged to thereby set the buffer gas pressure in the buffer gas feeding line;
   wherein the pressure packing is further configured and arranged during operation to use a pressure in the sensing line as pilot pressure for the pressure regulator to thereby set the buffer gas pressure.

2. The pressure packing according to claim 1, wherein a differential pressure control valve with a pilot input is the pressure regulator, wherein the sensing line is connected to the pilot input of the differential pressure control valve.

3. The pressure packing according to claim 1, wherein the sensing line is arranged in an upper part of the pressure packing.

4. The pressure packing according to claim 1, further including a purge panel with the pressure regulator being arranged in a first gas line of the purge panel that connects a buffer gas inlet and a buffer gas outlet of the purge panel,
   wherein the buffer gas outlet is connected to the buffer gas feeding line, and the buffer gas inlet connects a buffer gas supply to the purge panel, and a sensing line inlet is arranged on the purge panel and is connected to the sensing line.

5. The pressure packing according to claim 4, wherein the pressure regulator is connected to several buffer gas outlets of the purge panel.

6. The pressure packing according to claim 4, wherein the pressure regulator includes several pressure regulators connected to the first gas line in the purge panel, wherein the buffer gas outlet includes respective buffer gas outlets for each of the several pressure regulators, the sensing line includes respective sensing lines for each of the several pressure regulators, and the sensing line inlet includes respective sensing line inlets for each of the several pressure regulators.

7. The pressure packing according to claim 4, further including an isolation valve with downstream vent in the first gas line downstream of the buffer gas inlet.

8. The pressure packing according to claim 4, further including a filter in the first gas line downstream of the buffer gas inlet.

9. The pressure packing according to claim 4, further including a first pressure control valve in the first gas line upstream of the pressure regulator.

10. The pressure packing according to claim 9, further including
    at least one second gas line branches off the first gas line downstream of the first pressure control valve, and
    at least one additional buffer gas outlet on the purge panel that is connected to the at least one second gas line.

11. The pressure packing according to claim 10, further including a second pressure control valve in the at least one second gas line.

12. The pressure packing according to claim 10, further including a pressure relief valve in the purge panel that is connected to the at least one second gas line.

13. The pressure packing according to claim 4, further including a pressure relief valve in the purge panel that is connected to the gas line.

14. The pressure packing according to claim 1, further including
- a purge panel with an enclosure is provided with the pressure regulator being arranged in a first gas line of the purge panel that connects a buffer gas inlet and a buffer gas outlet of the purge panel, wherein the buffer gas outlet is connected to the buffer gas feeding line and the buffer gas inlet connects a buffer gas supply to the purge panel and wherein a pneumatic booster relay is provided outside of the enclosure wherein the sensing line is connected to a pilot port of the pneumatic booster relay, the first gas line is connected to a supply port of the pneumatic booster relay, and an output port of the pneumatic booster relay is connected to a sensing line inlet of the purge panel.

15. A reciprocating piston compressor with a pressure packing according to claim 1.

16. A method for operating a pressure packing for a reciprocating piston compressor, the pressure packing having a buffer gas barrier at a low-pressure side of the pressure packing and a number of sealing rings at an opposite high-pressure side of the pressure packing, wherein a vent volume is provided in the pressure packing between the buffer gas barrier and a last sealing ring of the number of sealing rings before the buffer gas barrier with a vent line being connected to the vent volume, the vent line configured for providing a flow of gas therethrough to drain gas from the vent volume, wherein a buffer gas volume is provided in the buffer gas barrier that is connected to a buffer gas feeding line, and wherein a sensing line is provided, the sensing line being separated from and not branched-off the vent line, the sensing line being connected at a first end to the vent volume with an opposite second end of the sensing line being closed, wherein the vent volume is connected to the vent line and to the sensing line, the method including the following steps: supplying a buffer gas with buffer gas pressure into the buffer gas volume via the buffer gas feeding line with the buffer gas pressure being higher than a vent pressure in the vent volume, no gas flows in the sensing line from the first end connected to the vent volume out of the opposite second end while there is gas flow through the vent line, and connecting a pressure regulator to the buffer gas feeding line for setting the buffer gas pressure in the buffer gas feeding line, using a pressure in the sensing line as pilot pressure for the pressure regulator for setting the buffer gas pressure.

\* \* \* \* \*